United States Patent
Sartorius

[11] 3,879,603
[45] Apr. 22, 1975

[54] ANALOG HEAT EXCHANGE COMPUTING SYSTEM

[75] Inventor: Guy Sartorius, Bau Saint-Martin, France

[73] Assignee: Societe des Aciers Fins de l'Est, Boulogne-Billancourt, France

[22] Filed: Feb. 21, 1973

[21] Appl. No.: 334,502

[30] Foreign Application Priority Data
Mar. 9, 1972 France .................... 72.08269

[52] U.S. Cl. ............. 235/151.1; 235/184; 266/5 T; 432/51
[51] Int. Cl. ............................................ G06g 7/56
[58] Field of Search .......... 235/151, 151.1; 266/3 R, 266/5 T

[56] References Cited
UNITED STATES PATENTS

| | | | |
|---|---|---|---|
| 3,252,693 | 5/1966 | Nelson | 235/151.1 |
| 3,478,808 | 11/1969 | Adams | 235/151.1 |
| 3,633,006 | 1/1972 | Inoue | 235/151 |
| 3,692,986 | 9/1972 | Nienstaedt et al. | 235/151.1 |

Primary Examiner—Felix D. Gruber
Attorney, Agent, or Firm—Browne, Beveridge, DeGrandi & Kline

[57] ABSTRACT

There is disclosed an automatic system for determining a heat exchange parameter, such as the temperature of the flue gases of a direct-flame heating furnace, for a mode of operation considered satisfactory or not, while the other parameters, such as dwell time, are prescribed. Analogue elements are controlled cyclically, permitting the computation by summation of a prescribed parameter from an approximate mathematical formula, into which enter the parameters of the known mode of operation and in particular the sought heat exchange parameter at the end of each cycle, (1) the result of the said summation and, (2) the prescribed value of a parameter are applied to a comparator. A step-by-step element is connected to the output of the comparator in such manner that the said step-by-step element is able, as a function of the comparison, either to modify the pre-adjusted value of the heat exchange parameter sought and send it back to the input of the anlogue elements, a new cycle being ordered or to remain at its last adjustment value at the end of the cycle, thus determining the value of the parameter sought.

12 Claims, 5 Drawing Figures

ANALOG HEAT EXCHANGE COMPUTING SYSTEM

This invention relates to an analogue comprising an automatic system for determining a heat exchange parameter, such as, for example, the temperature of the flue gases of a direct flame heating furnace, for a mode of operation different from an experimentally known mode of operation considered satisfactory or not, the other parameters being prescribed. It applies in particular, although not exclusively to continuous metallurgical annealing furnaces and to the problems of cooling therein.

In the making of refined carbon steels designed in particular for the motor vehicle industry, the steels concerned are exclusively steels used to manufacture parts required to undergo a thermal treatment. Rolling mill trains supplied with metal processed in an electric furnace roll products which may be: coiled wire, bars or sections of various cross-sectional shapes, flats, hexagons or other shapes. The metal must be converted by the user by different methods: machining, hot or cold forging, etc.

The evolution of the techniques and the faster and faster manufacturing rates that are required entail, where the metal is concerned, the obligation to have special properties for these conversion operations, for example a narrow hardness bracket for shearing or cutting before hot forging or a very regular suitable structure for machining or cold deformation.

These properties can be obtained only by recourse to very different annealing cycles adapted to each case. Moreover, the surface decarbonization of the products must be very limited so as not to impede subsequent hardenability. It is essential that the unavoidable surface decarbonization due to the hot conversion operations (rolling) is not increased and, if possible, is even reduced by the annealing operation.

To meet the requirements concerning surface decarbonization the solution of a furnace for annealing in an oxidizing atmosphere by heating with a direct flame has been devised, which makes it possible to obtain various annealing treatments among which there can be distinguished:

a. Softening annealing treatments the aim of which is to permit either shearing of the metal before forging, or a drawing operation with the possibility of then drawing the metal under rather good conditions;

b. Normalizing annealing treatments making it possible, without generally fundamentally changing the structure obtained by the cooling after rolling, to obtain good regularity of this structure and an improvement in the mechanical characteristics of resilience and elongation. For this type of annealing treatment, a high cooling power must be available in the zone that is concerned in the furnace;

c. Isothermal annealing treatments, which are used in the more and more frequent cases in which the metal (hypoeutectoid steels) is employed for making parts obtained by machining on high-output machines. The metallographic structure of the annealed metal is characterised by the presence of well distributed regular grains of lamellar perlite and of ferrite. The corresponding cooling zone of the furnace must therefore necessarily permit very fine control of the rate of decrease of the temperature, which control must be different according to the linear charge in the furnace and the cross-section of the metal to be annealed;

d. Spheroidizing annealing treatments, which are effected when the metal is afterwards converted either by cold deformation, if a hypoeutectoid steel is concerned, or by machining, if a hypereutectoid steel is concerned (in particular for the manufacture of ball bearing races). This type of annealing is characterised by the obtainment of a structure in which the cementite appears as globules distributed in a very even manner. In such a cycle there is encountered a plateau, which should be long, and a relatively slow final cooling rate.

The achievement of these different types of treatment consequently involves extremely variable speeds of passage of the products through the furnace. The demands of large-scale production associated with the various possibilities hereinbefore indicated have led to the construction of new furnaces equipped with more powerful cooling means. In particular, they make it possible to effect isothermal annealing operations which were not achievable before for heavy static charges.

There is already known a furnace employing recycling of the flue gases which pass into a water-flue gas exchanger, the flow of the flue gases being regulated, which presents certain difficulties in the production of the heat exchanges. This system moreover requires powerful and fragile fans. There are also systems of regulation exclusively with cold air which produce considerable oxidation of the products being treated and which may entail leakages to the adjacent furnace zones. Finally, some methods of precision cooling in annealing furnaces are valid only within narrow temperature ranges and do not permit general application to the various kinds of treatment as indicated hereinbefore.

Annealing furnaces with direct flame heating are known which comprise a series of independently regulated zones for raising and maintaining a temperature, for rapid cooling, for raising the temperature again after the rapid cooling in some cycles, and finally for slow and controlled cooling. In particular, in this type of furnace there are two rapid cooling zones which, according to the cycles, are capable of ensuring:

a. A very high cooling power for normalizing annealing, b. A very rapid and controlled cooling rate for the isotherm, c. A rapid and controlled cooling for spheroidizing annealing with a short plateau before the rise in temperature; these different aspects or behaviours being required to be suitable for different products such as bars or rings.

In these zones, the regulation of the temperature of the blown gases is obtained by indicating on a regulator the value enabling the desired cooling of the charge to be obtained. The regulator controls by cyclic pulses the air intake throttle valve of an exchanger through which passes a constant flow of the blown gases. It will be observed, therefore, that the regulation of the rapid-cooling temperatures is obtained indirectly by means of that of the recycled flue gases.

The difficulties which arise in such a problem of temperature regulation originate, on the one hand, from the variety of the regulating operations to be ensured in accordance with the desired cycles, and, on the other hand, from the fact that, in a continuous furnace in which products are cooled rapidly, the mill scale, the flue gases and the radiation prohibit correct measurement by observation of the temperature through a sight glass.

The invention proposes to solve and enable the rapid determination of the heat exchange parameters of metallurgical furnaces.

More generally speaking, the object of the invention is to provide means making it possible:

to forecast, from a given standard mode of operation deemed satisfactory, the regulating or control parameters for another mode of operation, while preserving the thermal profile of the furnace;

to deduce therefrom the heat load distribution for the various zones of the furnace;

to equip existing reheating furnaces at present controlled by a digital computer with an analogue computer and adjust the heating zones of these furnaces by means of the same system;

to use an existing furnace as a prototype for calculating othr furnaces;

to simulate the operation of a furnace.

It is moreover to be noted that if the furnace "drifts", that is to say suffers a deterioration of the blowing circuits, the computer enables the deviation to be detected from any test, then, following this test, makes it possible to re-standardize or re-adjust the coefficients of convection or radiation and find new instruction values.

In short, the invention proposes to determine, by analogue means, a parameter such as, for example, the temperature of the blowing flue gases of a cooling furnace, while knowing the other data established experimentally, such as the temperature of the various zones, the entry and exit temperatures of the products, the speed of passing through, and then to simulate a run to make a gradual correction until the same output value is obtained to within an approximation constant, which expresses the fact that the heat exchanges have taken place in the same way in the experimental run and in the real run with unmeasured input values in the simulated real exchange.

The system of the invention enabling a heat exchange parameter to be determined, the other parameters being prescribed, essentially comprises:

analogue elements controlled cyclically and permitting the summation of a prescribed heat parameter from an approximate mathematical formula, into which enter the parameters of the known mode of operation and in particular the parameter sought, a comparator into which there pass, on the one hand, at the end of each cycle, the results of the said summation and, on the other hand, the prescribed value of the prescribed parameters, and a step-by-step element connected to the output of the comparator in such manner that the said step-by-step element is able, as a function of the comparison, either to modify the pre-adjusted value of the heat exchange parameter sought which it sends back to the input of the analogue elements, a new test cycle being ordered, or to remain at its least adjustment value at the end of the cycle, while the other parts of the system are returned to the initial position and arrested, as a result of which the said last position of adjustment determines the parameter sought.

In a particular embodiment, the invention is applied to an arrangement permitting the automatic computation of a parameter for effecting adjustment in a direct flame furnace, with a radiating arched roof, at uniform or known temperature, zone by zone, by the flue gases of these zones.

In order to satisfy the conditions posed by the rapid cooling zones which may be provided in such a furnace, in particular the passing-through speeds variable to correspond to a production varying in the ratio of 1 to 6 and for cooling ranges extending from 1050° to 650° or from 850° to 650° with intermediate ranges, two independent zones with top and bottom blowing and independent recycling of the flue gases are provided. These two zones of the same length are separated by a zone fraction in which there is no blowing and called the "dead zone". When the material passes through this dead zone, there is superimposed a stage in the cooling of the metal which is manifested by a restoration of calories and which therefore retards the cooling.

The cooling principle adopted, which is the same for each zone, being of the high-speed forced convection type, which alone permits a high coefficient of exchange independent of the speed of the flue gases and their density, the aim of the invention is to create a computing system with which it is possible to establish a parameter of the exchanger, in particular the temperature prescribed for the flue gases for a desired passing-through time of the product.

In this case, the parameter sought is the temperature of the flue gases intended to regulate the heat exchange in the furnace, and the prescribed parameter is the dwell time of the charge in the furnace. In the case where it is desired to apply this method of carrying the invention into effect to a cooling furnace comprising a plurality of zones, there are automatic control means for causing the entry into the group of analogue computing elements of the variations in parameters taking account of the passage of the product being treated through the separated zones.

The use of an installation comprising the means which have just been indicated corresponds, generally speaking, to a process for determining a heat exchange regulating or control parameter in which a prescribed parameter is computed by analogue integration from an approximate mathematical formula into which enter the parameters of the known mode of operation, the value obtained is compared cycle by cycle with the adjustment value of the prescribed parameter and the cycles are recommended with modified data until the required value is obtained to within an approximation.

Other features and advantages will appear from the following description, given by way of non-limitative example, of an embodiment applied to the case of rapid cooling in a continuous annealing furnace using direct flame heating and with a radiating arched roof, and with reference to the accompanying drawing, in which.

At the root of the problem of computation of the heat exchanges in a furnace of this kind is the analogue resolution of the equation with the partial derivatives of the exchanges by radiation and by convection, of which the mathematical solution $\theta(t)$ cannot be made clearer, that is:

1. $d\theta [R(\theta), C(\theta)] = (\delta\theta/t_c) dtc + (\delta\theta/t_r) dtR$ in which $dtc$ is the time that would be necessary with convection alone to lower the temperature by $d\theta$ under the effect of a convection gradient:

2. $\delta\theta/\delta t_c) = A/C)(\theta - T)$, and $dtR$ is the time that would be necessary with radiation alone to lower the temperature by the same $d\theta$ under the effect of the radiation gradient:

3. $\delta\theta/\delta tR = R/C (\theta^4 - Z^4)$

In these equations, the following are the explanations of the notations:

- $\theta$: temperature of the product, R: radiation, C : convection,
- T: temperature of the flue gases, Z: temperature of a furnace zone
- A: coefficient of convection of the blowing apparatus,
- B: coefficient of radiation of the zone,
- C: heat capacity of the products which pass through in a time $dt$ corresponding to a cooling $d\theta$.

It is possible to establish an approximate heat exchange formula starting from a speed $v$ of the product in two different ways:

either it is proposed to modify the blowing temperature of the flue gases T and, knowing the initial temperature $\theta_o$ of the charge, it is endeavoured to determine a mode of operation for which the prescribed final temperature of the charge is $\theta_f$. The formula gives a temperature:

$\theta_c = f(t_f)$, in which $t_f$ is the dwell time and $\theta_c$ is the final temperature of the charge and, by repeated trial, $\theta_c$ (final temperature of the charge) is adjusted to its prescribed value $\theta_f$ if T is modified;

or else the blowing temperature T is modified and it is endeavoured to determine a mode of operation for which the dwell time is $t_f$. The formula gives a computed dwell time $t_c$ for a different speed $v$ of the product:

$t_c = g(\theta_f)$, in which $\theta_f$ is the final temperature of the charge and, by repeated trial, $t_c$ is adjusted to its prescribed value by modification of $T$.

This second method has been chosen in the following example with the embodiment of an analogue computer which, on the one hand, is fed with:

- the initial and final temperatures $\theta_o$ and $\theta_f$, respectively, of the products
- the blowing temperature $T$ (flue gases)
- the prescribed dwell time $t_f$.

The analogue computer, on the other hand, computes the dwell time $t_c$ by summation, compares this dwell time with the prescribed time $t_f$ to make, by repetition, an adjustment of the temperature $T$.

As a function of the total amount of heat removed with respect to time, and including radiation and convection, a formula for the heat exchanges has been established by graphic approximation, this formula being as follows:

4. $\Delta t = [C(\theta) \times \Delta\theta]/[A (Z) \times (\theta - T) + B (\theta^4 - Z^4)]$ in which:

- $\Delta t$ is the elementary variation of the dwell time,
- $\Delta\theta$ is the variation of temperature of the product, $\theta$ is the temperature considered at the step of the computation, the other notations being those indicated hereinbefore for the formulas (2) and (3).

There will be seen in the continuation of this description the forms of organization of a computer effecting the computation of formula (4) and it will be seen how a summation and a comparison of the results can be instituted. It is necessary to operatre by cut-off the temperatures of the products between two fixed limits $\theta_o$ and $\theta_f$ and to accumulate the results $\Delta t$ at the output of the analogue elements. This accumulation may be effected either in steps or in a continuous manner with, in each case, the elements that are necessary. Account will also be taken of the prescribed speed of the product in the furnace, since the final dwell time serves as a reference and these two variables are linked.

Figure 1:
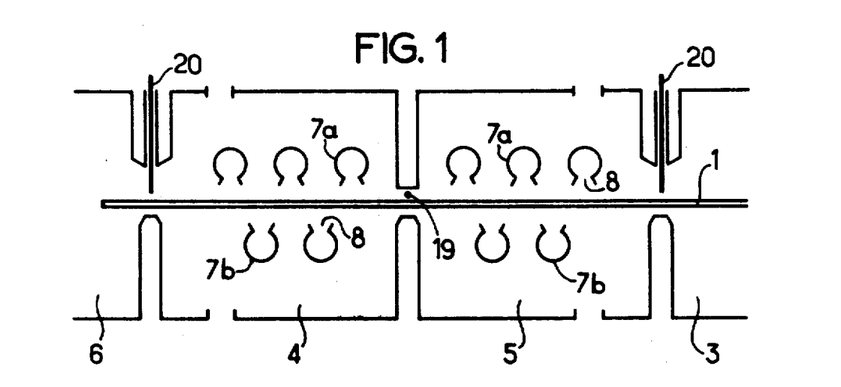
FIG. 1 is a diagrammatic longitudinal section of the furnace which is limited to two zones.
Figure 2:
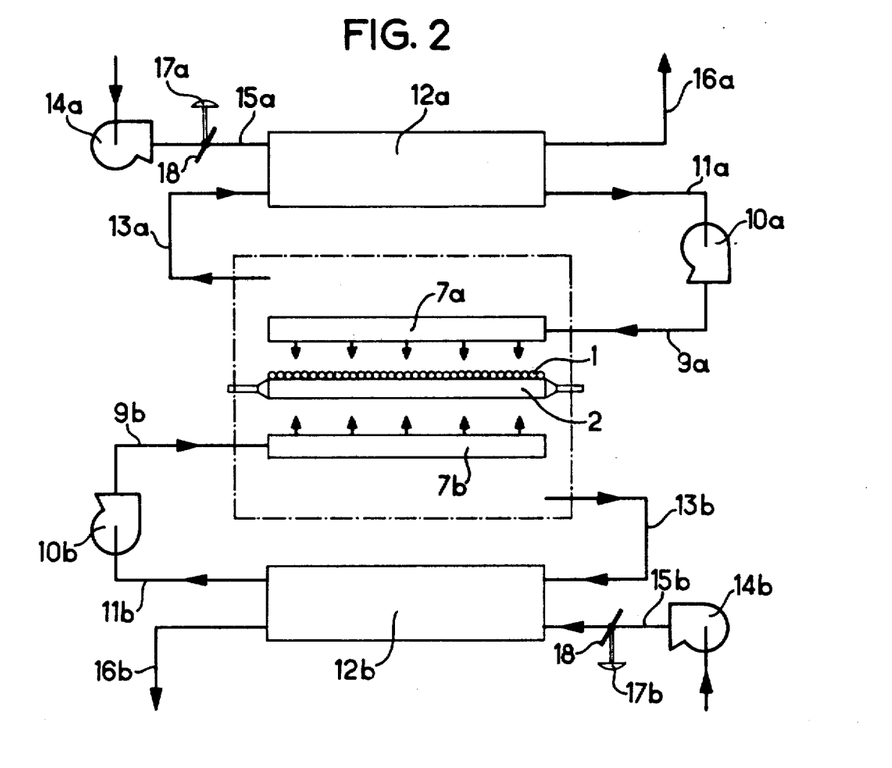
FIG. 2 is a cross-section of the cooling circuits of the furnace.

The natural conditions imposed by the structure of the furnace to which the embodiment described relates will now be seen. An annealing treatment of bars or rods is effected in a furnace of which only part is shown diagrammatically in FIG. 1. The furnace comprises a plurality of zones designed for carrying out gradual heating and cooling operations as mentioned at the beginning of this description. A sheet or layer of bars 1 is charged into the zones located on the right of FIG. 1 (not shown) and it moves to the left on rollers 2, as can be seen in FIG. 2.

The division of the furnace into zones is imposed by the various cycles provided for and in order to comply with the conditions of time and temperature that are necessary. Thus, the part 3 of FIG. 1 comprises in reality three heating zones for increase in and maintenance at a temperature with the possibility of treatment up to 1100°C. The central part of FIG. 1 shows two rapid-cooling zones 4, 5 of the orthogonal-convection type which will be described hereinafter. Following this part, in the path of the bars, there is yet another plurality of holding or slow cooling zones 6 which will not be described in detail by reason of the fact that they spring from the known techniques. It should be understood that the zones 4 and 5, like their neighbours, are designed for performing varied treatments with all the necessary area and for lending themselves to a variable speed of movement of the products according to the production desired. I will confine myself in the following to giving the description of a single case of use of the zones 4 and 5 in rapid cooling with a plateau, although in some cases these zones can be used in heating with burners (not shown) of the blown air and gas type. The regulation of the rapid-cooling temperatures is obtained indirectly by that of the recycled flue gases, as can be seen in FIG. 2.

The even cooling of the charge 1 throughout the width of the furnace is ensured by tubes 7a, 7b located perpendicular to, and above and below, respectively, the rollers 2 supporting the sheet of bars. The tubes 7a and 7b are provided with orifices 8 which direct against the bars the flow of the cooling flue gases coming from conduits 9a, 9b connected to powerful blowers 10a, 10b which themselves draw in at constant volume through conduits 11a, 11b extending from exchangers 12a, 12b. It is known that exchangers, the technique of which is well known, are generally composed of sets or systems of metal tubes in two non-communicating parallel volumes corresponding to the two fluids subjected to the heat exchange, a more detailed description not being necessary in this connection. The flue gas circuit 11a, 11b is completed by the suction conduits 13a, 13b between the furnace and the exchanger. Moreover, another two blowers 14a, 14b drawing in cold air from outside force it through shafts 15a and 15b, respectively, and through the exchangers 12a, 12b and from here to atmosphere through shafts 16a, 16b. Along the path of the shafts 15a, 15b there are incorporated regulators 17 a, 17b operating by variation of the opening of an intake butterfly or throttle valve shown diagrammatically at 18.

If reference is again made to FIG. 1, it will be seen that the zones 4 and 5 of the furnace, which are of the same length, are separated by a zone fraction 19 in which no blowing takes place and which will be referred to hereinafter by the term "dead zone". It is in this zone and with a certain lag that the stage of transformation of the metal will commence. Shields 20 represent very diagrammatically the devices ensuring a certain gas-tightness of the two zones 4 and 5.

If the temperature of the flue gases blown into the exchangers is designated by the reference T, the regulation is obtained by setting on a regulator the value enabling the desired cooling of the charge to be obtained, as a function of its constitution and the speed. The latter is imposed by the other metallurgical constraints of the treatment, in particular the plateau time before or after the rapid-cooling zones. The regulation is effected by command by cyclic pulses of the intake of cold air by the butterfly valves 18.

Figure 5:
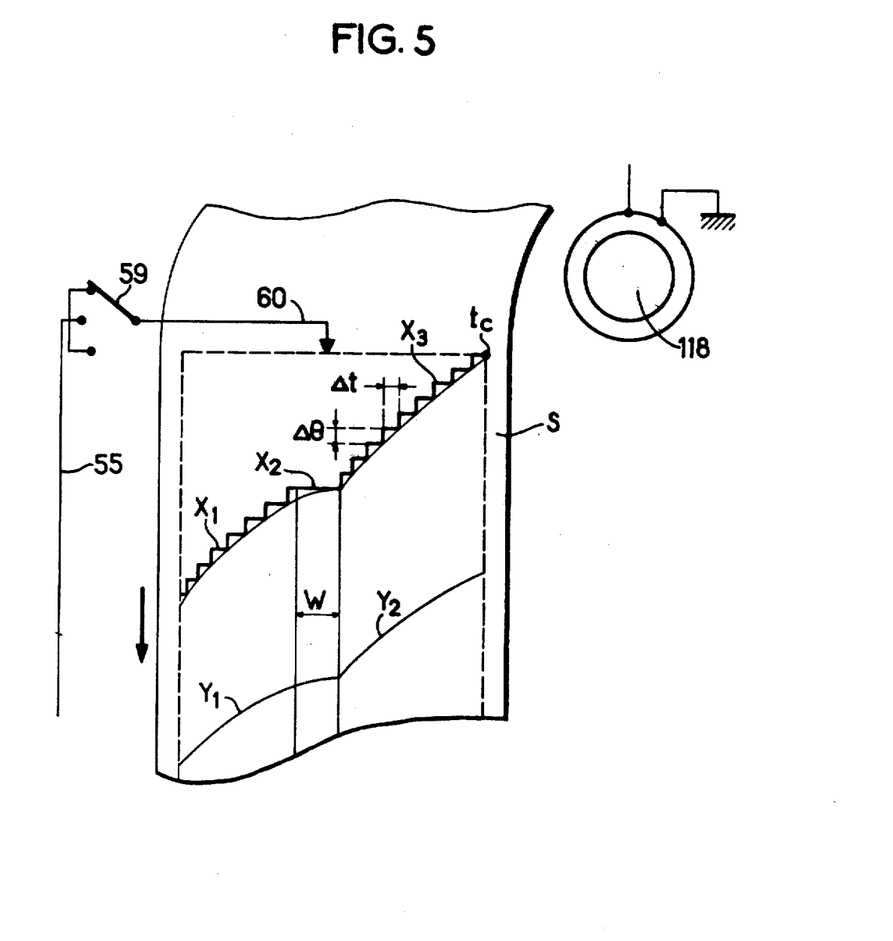
FIG. 5 is a diagrammatic representation of the recorder.

To establish formula (4) hereinbefore indicated, two tests are first of all carried out:

In a first case, the cooling temperatures range from 850° to 650°C. If a temperature of 450°C is accepted for the blown flue gases, the furance is at a mean temperature of 600°C in zone 5. The flue gases issuing from the orifices 8 of the tubes 7a, 7b keep close to the bars, flow along outside the tubes 7a, 7b and meet up with the walls and the roofs of the zones, where they are drawn off. By reason of the powerful convection, it can be accepted that the roofs and the walls are practically speaking at the mean temperature and that all the exchanges can be reduced to an equivalent convection.

In a second case of cooling, from 1050° to 650°C, the exchanges by radiation are proportionally larger than in the preceding case, the share of the convection not being negligible, however. It is easy to deduce the shares of the radiation and the convection, and the parameters $A(Z)$, B and $C(\theta)$ which permit the use of the formula (4) established by approximation.

For these tests, thermocouple probes are incorporated and screened in the heart of the bars, the temperature of the flue gases being given and at a certain chosen speed V. From these starting experimental data the computer determines the sum of the increases in the dwell time as a function of the elementary variations of the temperature of the product. In formula (4), the factor $A(Z) \times (\theta \times t)$ represents the convection and the factor $B(\theta^4 - Z^4)$ the radiation. The computer traces point by point the steps of cooling time $\Delta t (\theta)$ for elementary temperature intervals or ranges:

(5. $\Delta\theta = (\theta_o - \theta_F)/n$ in which $\theta_o$ is the initial temperature of the product $\theta_F$ is the final temperature to be ensured $n$ is the number of steps fixed arbitrarily for the computer.

From this standard test, which gives in accordance with formula (4) the gauging dwell time $t_f$ for the speed $v$ fixed at the beginning and T proposed, the dwell time $t'_F$ for a different speed $V'$ can easily be deduced.

In effect, with respect to theoretical $tF$ resulting from a standard test for $v$ fixed at the beginning, there exists the geometrical relation of the length of the zones:

6. $t'_f = t_f \times v/v'$ the computer makes a series of tests with modifications of temperature of the flue gases T' different from T until it finds a dwell time:

$t_c = t'_f$.

Figure 3:
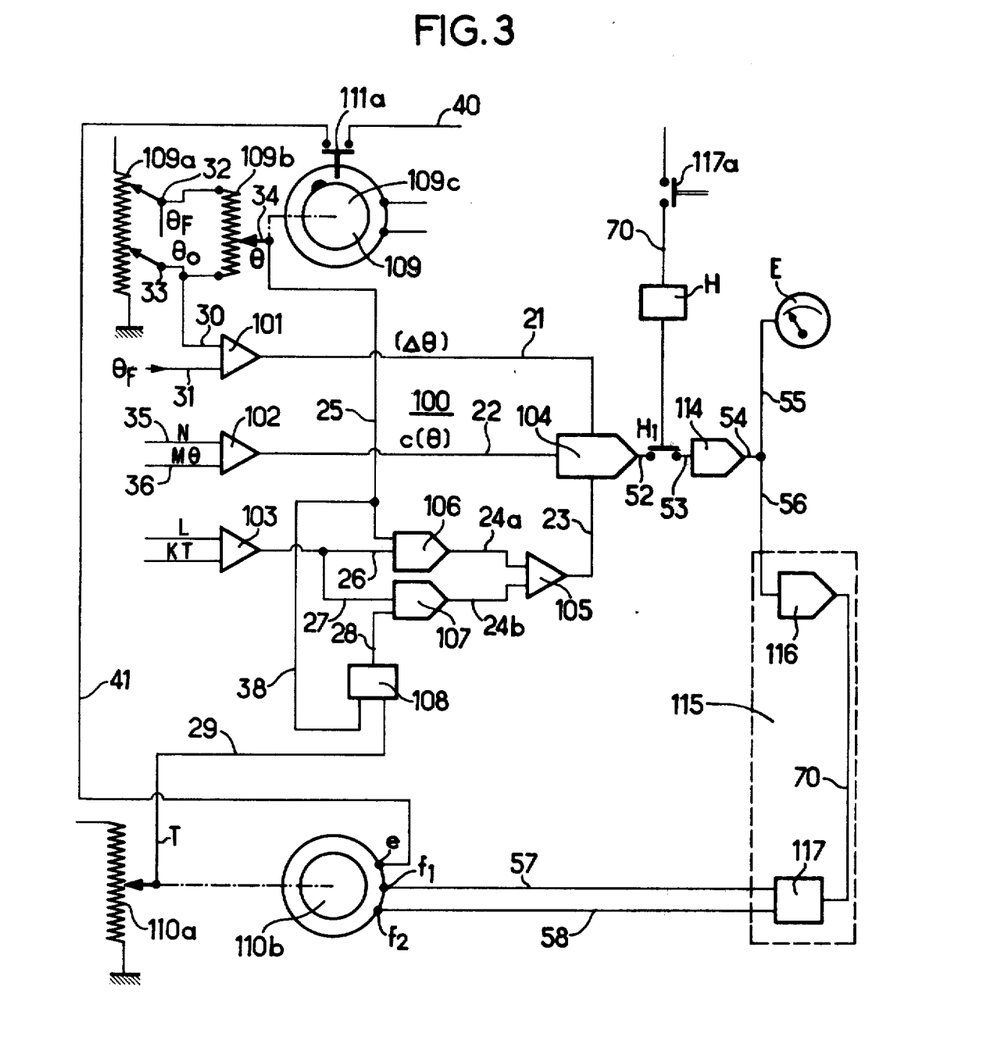
FIG. 3 is a general working diagram of the computer.

FIG. 3 shows the general arrangement of the computer, the principle elements of which are designated by three-figure references. An assembly of computing modules is designated generally by the reference 100. It comprises:

1. Three input modules 101, 102, 103, namely:
   a module 101 performing the function (5) $\Delta\theta = (\theta - \theta_f)/n$, it being possible for the number of steps to be 40, for example,
   a module 102 performing a function (8) $C(\theta) = M\theta + N$, which will be explained hereinafter,
   a module 103 performing a function (9) $Z(T) = KT^1 + C$, which will likewise be explained hereinafter.

2. A computing assembly the details of which are not described by reason of the fact that this example can be produced using modules are commercially available, the assembly being only shown symbolically. It comprises the following analogue functions; the function represented by 104 which produces the variations $\Delta t$ by receiving:

a first input 21 representing the variation ($\Delta\theta$) proceeding from the input module 101, a second input 22 representing the value $C(\theta)$ of the coefficient of specific heat and issuing from the input module 102, a third input receiving a value represents the denominator of the ratio of the formula (4), this value issuing on the line 23 from adder 105 defined as follows. This function 105 has two inputs, one of which is connected by 24a to the output of the unit 106 and represents a function $B(\theta^4 - Z^4)$ of the formula (4), while the other is connected by 24b to the output of the module 107 and represents the function $A(Z) \times (\theta - T)$ of the formula (4).

The unit 106 comprises in reality a group of modules which perform operations with B, $\theta$ and Z; likewise, the unit 107 comprises in reality the modules adapted to effect the operations on A, $\theta$ and T. The unit or assembly 106 has two inputs, one of which 25 corresponds to the accumulated cut-off temperature $\theta$, as will be seen hereinafter, while the other input 26 is connected to the output of the module 103 which computes Z. The unit or assembly 107 has two inputs one of which is likewise connected by 27 to the output of the module 103, while the other is connected by 28 to a module 108 which effects $(\theta - T)$ of the formula (4). This module 108 itself has two inputs for values $\theta$ and T connected by 58 and 29, respectively, to the potentiometer 109b which cuts off the temperatures of $\theta_o$ and $\theta_f$ and to the potentiometer 110a which fixes the temperature of the flue gases T by its wiper or sliding contact.

Following the examination of the computing elements, we will now see the input variables. The module 101 is connected by the conductors 30 and 31, respectively, to the centre of the sliding contacts 32, 33 of the potentiometer 109a, as a result of which the variation of temperature prescribed for or imposed on the product can be fixed. These sliding contacts 32, 33 feed in their turn a second potentiometer 109b the sliding contact 34 of which shifts under the action of a motor 109c which is itself in motion under the effect of pulses originating from a clock H. The input module 102 receives two inputs 35, 36, being $M\theta$ and N, respectively, to effect the specific-heat correction in accordance with a law of the form:

8. $C = M\theta + N$, in which M and N are coefficients.

The gauging of C will be effected from the first gauging test which will have given $A/C_0$ and $B/C_0$ for a temperature of $\theta_0$ at the start. Another test with any start $\theta$ will give $A/C$ and $B/C$. The value B being the same in both cases, we will have $C/C_0$. The relative adjustment of M and N will be effected from the tables of specific heats as a function of the temperature.

The input module 103, with inputs KT and L as illustrated, performs a correction due to the temperatures of the radiation zones 4 and 5 which can be seen in FIG. 1 these temperatures being substantially a linear function of the variable T (temperature of the flue gases). This function is expressed by the formula:

9. $Z = KT + L$, in which K and L are coefficients.

Figure 4:
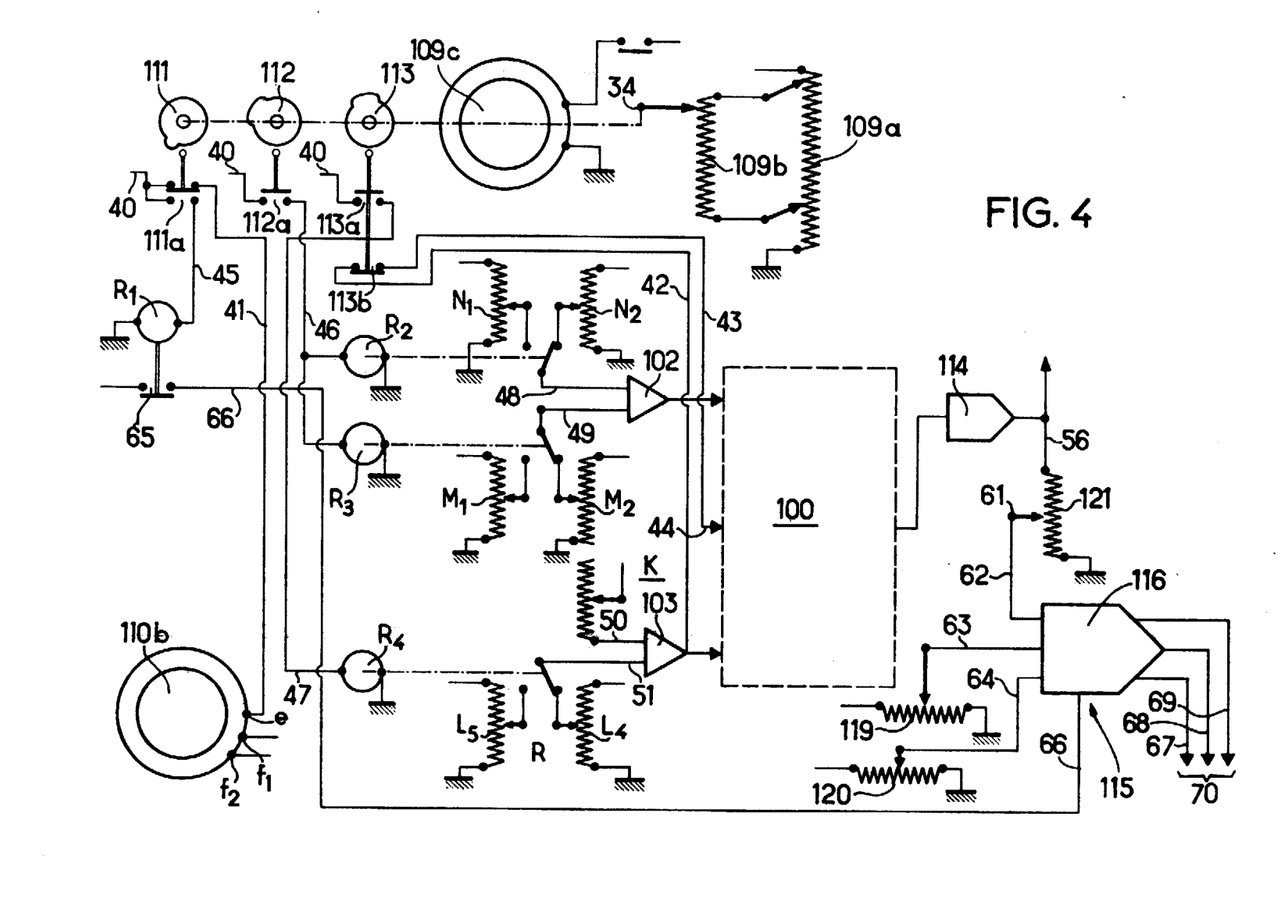
FIG. 4 is a diagram of the special circuits.

The laws of variation which are determined by the foregoing formulas (8) and (9) are dependent on the passage of the product through the three separate parts visible in FIG. 1, the zone 4, the dead zone 19 and the zone 5. Control means must therefore intervene and these are described hereinafter with reference to FIG. 4. The motor 109c is calculated to carry out a cycle corresponding to the complete cut-off of the initial temperature and the final temperature of the product. It includes a shaft equipped with cams 111, 112, 113 which are respectively adjusted to actuate microswitches under the following conditions:

111 closes its contact 111a at the beginning of a cycle;

112 closes its contact 112a when the product enters the plateau;

113 closes its contact 113a when the product passes into the dead zone.

It is apparent from an examination of FIG. 4 that the cams 111 and 113 also control normally closed or break contacts for the purpose of the following actions: a contact 111a is opened at the beginning of the cycle to arrest the operation of the motor 110b, this contact being located in the path of a source of current U extending through a conductor 40 and through a conductor 41 connected to a terminal e of the motor 110b, this motor having other commands which will be seen hereinafter. A contact 113b of the cam 113 breaks another circuit, on the one hand 42, between the output of the module 103 for temperature correction of the zones and the contact 113b, and, on the other hand 43, from this contact 113b to an input 44 to the computer 100 and then to the modules (not shown) for correction of the coefficient A of formula (4). In effect, when a product passes through the dead zone, there is no convection by blowing, but only transfer of heat by radiation. Thus, the cam 113 effects temporarily the zeroizing of the coefficient A. The input 44 is connected in the computer to elements which intervene in the assembly 100 hereinbefore described.

Reverting to the make contacts of the cams, we can see that the cam 111 controls through its contact 111a a circuit 45 leading to the coil of a relay $R_1$ which is itself provided with a make contact the function of which will become apparent hereinafter. The cam 112 controls, by its contact 112a, the circuit 46 leading to the coils of two delay relays $R_2$ and $R_3$ and the cam 113 controls through its contact 113a a circuit 47 leading to the coil of a relay $R_4$. Each of these relays controls, by potentiometric means which it is not necessary to describe in greater detail, the voltage of the inputs of the modules 102 and 103. These voltages are controlled respectively as a function of the entry of the product into the plateau and into the dead zone. It will be remembered that the module 102 perfoms a function (8) $C = M\theta + N$ carrying out a correction of the specific heat. It is therefore apparent that, under the effect of the cam 112, the relay $R_2$ can change over the first input 48 of the module 102 from one potentiometer value $N_1$ to another value $N_2$. Likewise, the relay $R_3$ can changes over the second input 49 of the module 102 from a potentiometer value $M_1$ to a value $M_2$ The module 103 has two inputs 50 and 51, the input 50 being connected to a potentiometer adjusting the fixed value K of formula (9) $KT + L$. On the other hand, the second input 51 is connected to the contact of the relay $R_4$ which, under the effect of the contact 113a of the dead zone cam 113, can change over the input 51 from a potentiometer value $L_4$ to another value $L_5$. The values $L_4$ and $L_5$ respectively correspond to the coefficients of radiation of the zones 4 and 5, while K is a constant.

If reference is again made to FIG. 3, the elements arranged at the output of the algebraic computer 100 will be considered. The last module 104 delivers the result of the formula (4) to a circuit 52 broken by the contact $H_1$ of the clock H and, after this contact, the circuit 53 constitutes the input of a summation element 114. The latter may be a store operating step by step and therefore effecting the accumulation of the values $\Delta t$. The output 54 of the summation element 114 is divided into two branches 55 and 56, the first of which leads to a recording device E, while the second leads to a comparator assembly 115 which will be described hereinafter.

Finally, it can be seen in FIG. 3 that the step-by-step motor 110b of the potentiometer 110a comprises three control inputs, one of which e, is already indicated, is under the control of the beginning-of-cycle cam 111 (FIG. 4), while the other two inputs $f_1$ and $f_2$ enable the motor to be operated in one sense or the other. It is obvious that these inputs e, $f_1$ and $f_2$ are in reality those of a known apparatus (not shown) for operating the step-by-step motor 110b the running-sense conductors are 57 and 58, respectively, and lead to a relay control 117 not described in detail.

In FIG. 5, the recorder E of FIG. 3, which is by no means indispensable, is shown in a more descriptive, although diagrammatic, manner. The conductor 55 leads to a change-over switch 59 which makes a choice of scale acting on the command 60 corresponding to the movement of the cycle of the recorder. The motor 118 of the recorder unrolls the paper S downwardly, while the pen can move from left to right. The operation of the computer being timed by the contact $H_1$ of the clock, in synchronism with the cut-off of the potentiometer 109b, the temperature differences $\Delta\theta$ are constant, while the time steps $\Delta t$ are those accumulated by the adder 114. In the drawing there appears a first run of time steps $X_1$ corresponding to the zone 4, then a time W of crossing of the dead zone, and a second run of steps $X_3$ corresponding to the zone 5.

A continuous summation may also be envisaged, the motor 109 of FIG. 4 being then a synchronous motor and the element 114 an integrator. The recorder then presents a curve represented by $Y_1$, $Y_2$ in FIG. 5. In this case, the motor 118 of the recorder is synchronised with the motor 109c, so that the speeds are well proportioned. Thus, the sweep time of the cyclic potentiometer corresponds to the unrolling of a constant length of paper, so that the graph always represents the sought total cooling time.

The dwell time $t_c$ appears on the recorder at the end of the cycle, as is apparent from FIG. 5.

Reference will now be made to FIG. 4, in which the comparator 116 appears in the right-hand part of the drawing. The output conductor 56 of the adder 114 leads to a potentiometer 121 having a sliding contact 61 the position of which fixes a desired value $v'$ of the speed corresponding to and actual working. From this sliding contact the analogue voltage is conveyed to an input 62 of the comparator 116. The comparator moreover receives a second input voltage 63 issuing from an adjusting potentiometer 119 and a third input 64 from a second adjusting potentiometer 120. The potentiometers 119 and 120 impose a value of the dwell time $t_F$ plus or less, respectively, and admissible error value. The comparator, therefore has the function of finding the instant when the input volatage on the conductor 62 becomes equal to the imposed or prescribed value of the dwell time $t_f$ with an approximation less than the permitted error.

The comparator, however, is permitted to operate only once at the end of a cycle, as is evident in FIG. 4, in which the contact 65 of the relay $R_1$ sends a command voltage to the comparator 116 on the conductor 66. The comparator can therefore send only at the end of a cycle an signals 67, 68, 69, which are shown diagrammatically by a single line 70 in FIG. 3, this command 70 acting on the relay box 117 to issue three different orders: if the computed time to corrected by the potentiometer 121 is less than the time prescribed by the potentiometers 119, 120, it is necessary to reduce the temperature T f the flue gases and therefore an the motor 110b to move back one step; if the time tc is too voltage it is necessary, on the other hand, to make the motor 110b advance by one step and, in these two cases, recommence the computation with the new value T. Finally, if the input time at 62 falls within the permitted approximation, a stop order is given by the relay box 117. In this last case, a contact 117a of the box 117, which can be seen in FIG. 3, breaks the circuit 70 which, in turn, arrests the operation of the clock, the latter then ceasing to cause the motor 109c to advance by pulses, so that the whole of the computer is blocked. As long as the stop order is not given, that is to say every time that the potentiometer 110a has changed its position at the end of a cycle, the cycle continues and the new value of the temperature T fixed by the potentiometer 110a enters afresh through the conductor 29 (FIG. 3) the element 108 for a new computation. Since the other parameters are unchanged, it can thus be seen that the duly adjusted computer can effect, by successive tests, the adjustment of the temperature T.

In brief, from a few standard tests, but theoretically from two only, at a speed $v$, there will be found by another cooling operation and another speed, the correct blowing temperature, with a precision of the order of 2 percent of the cooling range.

As another practical outcome, the computer can permanently relieve the technician of programming of the furnace cycles and allow him to apply his efforts to the metallurgical structure tests in the laboratory which provide a basis for the computations.

It is moreover possible for the computer not to remain a laboratory apparatus, but be able also to serve for directly commanding an instruction controller after display of the parameters of the cycle.

Finally, it is necessary to call to mind its possibilities of use for heating operations in furnaces, in particular as a furnace research apparatus for the processed inputs of direct digital computers, that is to say controlling the furnace fluids directly from the instruction display.

Generally speaking, the invention is capable of a large number of adaptations without departing from the essence of its principal means.

What is claimed is:

1. In an analogue heat exchange automatic computing system for adjusting the temperature of the heated gases in a metallurgical direct flame treatment furnace having at least one treating zone and means in the zone to detect heat exchange parameters including a first value of the temperature of the gases, a fixed dwelling time of a charge determined by its travel through said furnace, comprising:

analogue means for computing a voltage value representing a second dwelling time corresponding to said heat exchange parameters and said first value of said temperature;

comparator means comparing said computed voltage value with voltages representing said fixed dwelling time for providing an output signal when the difference therebetween exceeds a predetermined amount;

a step-by-step control element connected responsively to said output signal for changing said first value of said temperature to a second value thereof; and means actuated by said step-by-step element for introducing said second value of said temperature into said analogue means; said analogue means being means to determine a voltage representing a modified second dwelling time.

2. In the automatic computing system according to claim 1 for the determination of a heat parameter such as the temperature of flu gases of an annealing furnace including a plurality of zones, said system additionally comprising automatic control means, said automatic control means including means to enter parameters measured from the treatment of the product through separate zones into said analogue means.

3. In the analogue heat exchange automatic computing system as defined in claim 2, wherein said analogue means comprises:

a potentiometer means including a master clock for varying the temperature of the charge from its entry value to its exit value, a first input operator (101) connected to said potentiometer means for computing a small value of variation of the temperature of the charge $$(\theta - \theta_F)/n = \Delta\theta,$$

a second input operator (102) for computing the specific heat coefficients with the temperature of the charge and experimentally known coefficients $$(M\theta + N),$$

a third input operator (103) for computing the temperature of a furnace zone with one value of the temperature of the travelling flue gases and experimentally known coefficients $$(KT + L),$$

a fourth operator (106) for computing the effect of convention on the heat exchange, a fifth operator (107) for computing the effect of radiation on the heat exchange, said fourth and fifth operators being connected to the output of said third operator (103), an algebraic computation means connected to the outputs of said first input operator (101), said second input operator (103), said fourth and fifth operators (106, 107) and said potentiometer means for computing the value of a small range of dwelling time, and an adding means for accumulating said values of dwelling times.

4. In the system according to claim 3 including a step-by-step motor for actuating said potentiometer means; and means connected to said master clock for timing the input to said adding means, said adding means comprising a storage element.

5. In the system according to claim 3 including a synchronous motor for actuating said potentiometer means, and wherein said adding means is an integrating element.

6. In the system according to claim 3 wherein said automatic control means comprises cams driven by said potentiometer means, operation relays connected to said second and third input operators, and contacts connected to said cams to activate said operation relays to introduce the second and third input operators to the analog system.

7. In the system according to claim 3 wherein said step-by-step element comprises a balancing potentiometer, said balancing potentiometer including means driven forward or backward by relays, said relays connected responsively to said comparator means and receiving instructions therefrom, and means to initiate operation of said balancing potentiometer only upon the commencement of a computing cycle.

8. In the system according to claim 3 including a potentiometer connected between said step-by-step control element and said comparator means, said potentiometer being set corresponding to a fixed velocity of a charge through said treatment furnace.

9. In the system according to claim 1 wherein said step-by-step control element comprises a balancing potentiometer, said balancing potentiometer including means driven forward or backward by relays, said relays connected responsively to said comparator means and receiving instructions therefrom; and means to initiate operation of said balancing potentiometer only upon the commencement of a computing cycle.

10. In the system according to claim 1 including a potentiometer connected between said step-by-step control element and said comparator means, said potentiometer being set corresponding to a fixed velocity of a charge through said treatement furnace.

11. Apparatus for automatically determining a heat exchange parameter, such as desired temperature of the flue gases of a direct flame heating furnace which includes internal means to determine heat exchange parameters therewithin, for a mode of operation different from a predetermined mode of operation wherein the dwell time of the change in the furnace is predetermined, said apparatus comprising an analogue computer for computing a new value of one of said heat exchange parameters, said analogue computer including analogue integration means to which is applied said new value, comparator means, said comparator means comparing the output of said integration means with a predetermined parameter and producing an output indicative of the difference therebetween, and means connected to the output of said comparator means to modify one of said heat exchange parameters for introducing a further value of said one heat exchange parameter into said analogue computer until a desired parameter has been obtained, when said comparator means has produced an output.

12. A method for automatically controlling the temperature of the travelling flue gases in a metallurgical direct flame treatment furnace wherein the fixed dwell time of a charge to be treated in the furnace has a prescribed value corresponding to a fixed temperature, and wherein parameters due to convection alone in the furnace are compared with parameters due to radiation and convection to determine radiation and convection parameters, comprising the steps of computing a voltage representative of a second dwelling time for a value of the temperature of the travelling flue gases from parameters indicative of the temperature of the charge, the temperature of the flue gases of said furnace, the temperature of a furnace zone, the heat capacity of the charge and coefficients of convection and radiation, comparing said voltage representative of second dwelling time with the value for said fixed dwell time, and varying the parameter indicative of temperature of the flue gases and recomputing the voltage representative of the second value of the temperature of said travelling flue gases, said second value of the flue gases differing from the first value when the computed second dwelling time differs from the fixed dwell time.

* * * * *